April 19, 1927.  F. HOSTETTLER  1,625,542
PREPARATION OF NONFERMENTED BEVERAGES
Filed Aug. 23, 1926
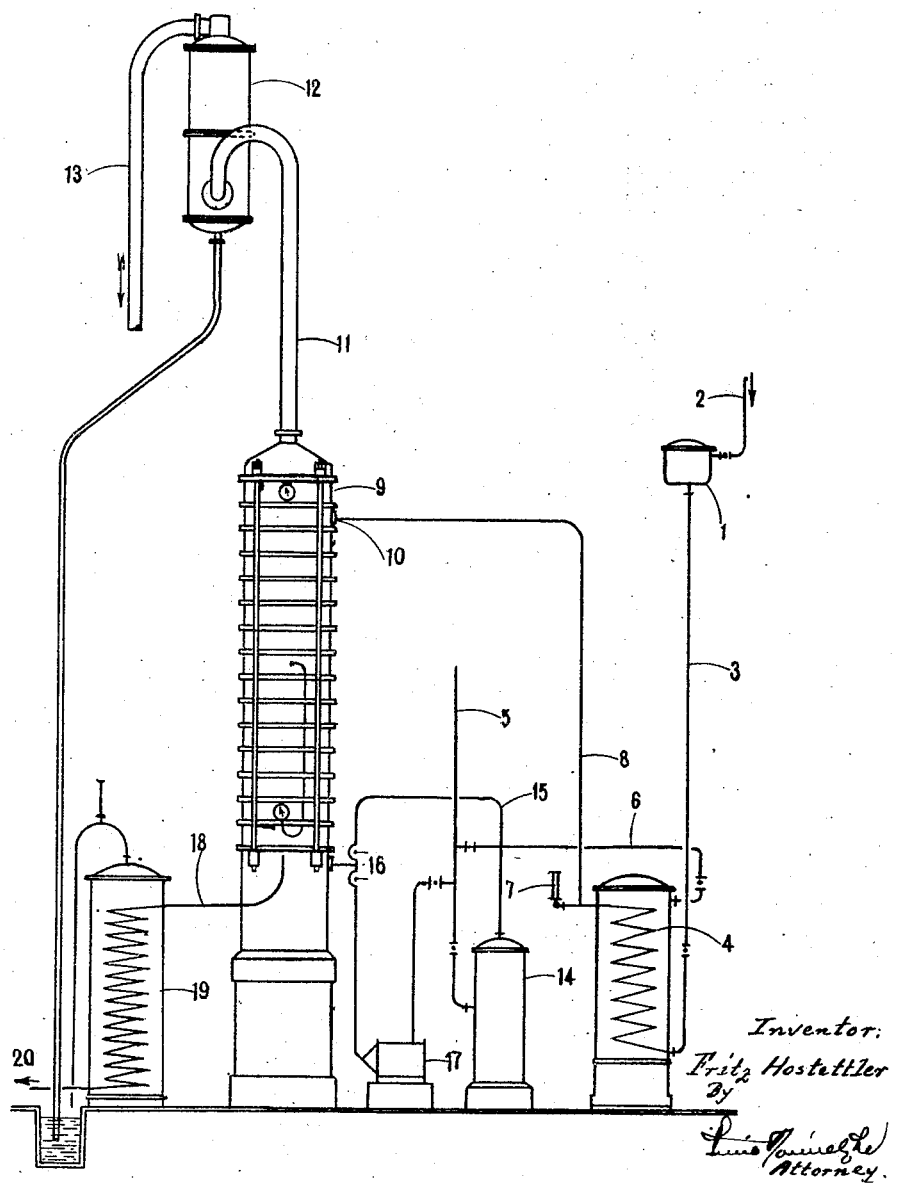
Inventor:
Fritz Hostettler
By
Attorney.

Patented Apr. 19, 1927.

1,625,542

UNITED STATES PATENT OFFICE.

FRITZ HOSTETTLER, OF BERN, SWITZERLAND.

PREPARATION OF NONFERMENTED BEVERAGES.

Application filed August 23, 1926, Serial No. 130,993, and in Switzerland September 17, 1925.

At the time of harvesting the fruit for making cider, the abundance of must is such that the employment of a large refrigerating and pasteurizing plant is essential in order to keep a sufficient quantity in good shape during the whole year. The difficulties hitherto encountered in this respect by manufacturers of non-alcoholic beverages made of fruit juice, and the sometimes enormous loss by waste in this manufacturing process, which waste is due to the fact that in spite of all precautions taken some musts will ferment unexpectedly have increased manufacturing prices to such an extent that it has not been possible heretofore to put on the market non-fermented beverages made solely from fruit juice at such a price that the market will become lively at periods of great harvesting.

The object of the present invention is therefore a process which allows non-fermented musts to be stored without using an extensive refrigerating and pasteurizing plant, or without adding alcohol for preserving purposes. The treatment of fresh juice may be undertaken at any time of the year and regardless of the outside temperature.

The new process cons'sts in adding to the fresh fruit juice sulphurous anhydrid to such an extent that fermenting is prevented. This treatment frees the must of all impurities and permits it to be stored under the same conditions as any other beverage. When the time arrives for consumption of the must, the latter is desulphurated by means of apparatus for transfusing it with humidified air. Moreover, in order to avoid the disagreeable cooked taste peculiar to all non-fermented pasteurized beverages known up to date, the entire disulphurating is preferably effected at a relatively low temperature.

In the annexed drawing a plant is represented as an example with which the process according to the present invention may be performed. The parts are represented diagrammatically but the smaller accessories generally used and known by men of the trade are not shown.

1 designates a float basin into which the sulphurated must is delivered through a pipe 2. Thence the must descends by a pipe 3 to the bottom of a steam-heated reheater 4. A branch 6 of the steam feed pipe 5 joins the reheater and the temperature of the heated must may be controlled by a thermometer 7.

The must is then taken through a pipe 8 into a desulphurating column 9 at the top of which it is introduced through a diaphragm 10 having an adjustable passage way. The desulphurating column communicates by means of a conduit 11 with a condenser 12 connected by a pipe 13 to a non-represented air pump. A humidifying device 14 which serves as a steam generator is heated by means of the feed pipe 5 and is fed with pure water from a non-represented conduit. The steam escapes through a pipe 15 and is delivered into a pipe 16 which conducts the air for transfusing the must from an air heater 17 heated by a branch of the steam pipe 5 into the column 9.

The bottom of the desulphurating column communicates by means of a pipe 18 with a refrigerator 19 enclosing a coiled pipe joined to the suction pipe 20 of a pump for the desulphurated must.

At the time of cider making during the harvest period the fruit juice is treated with sulphurous anhydrid which is incorporated into the juice under pressure and taken from carboys or steel bottles filled at the works. This sulphurating produces an almost instantaneous cleansing of the juice by precipitating the pectines. A part of the sulphurous anhydrid remains however in solution as a preserving and antiseptic agent in the liquid and prevents any fermenting. In this state the must may be kept in storage any length of time like any other fermented beverage.

Whenever some must is to be used the sulphurated juice is introduced into the reheating device 4 from the basis 1 and leaves the reheater at a given temperature and at a higher pressure than that existing in the desulphurating column 9. On the delivery side of the diaphragm 10 a sudden expansion of the vapours suspended within the column will take place which facilitates expulsion of the sulphurous anhydrid. The juice will descend to the bottom of the column at the foot of which the transfusing air is introduced in a heated state from the air heater 17. This air is first humidified by means of steam generated in the humidifier 14.

Controlling cocks are provided not only for varying the quantity of air admitted but also for varying its humidity.

After having passed the column, the desulphurated juice passes into the coil of the refrigerator 19 whence it is withdrawn and delivered into the receptacles for public use.

It may be remarked that the whole desulphurating operation can be performed inside of the column at relatively low temperatures, owing to the partial vacuum in said column, and can be carried out to such a degree that the objectionable cooked taste present in most non-fermented beverages produced from fresh juice is entirely avoided.

Thus the use of cider at a moderate price can be greatly facilitated and can always be adapted to the casual need of the market, and this owing solely to the particular nature of the described process and the absence of any loss during the storing of the must.

What I claim as new and wish to secure by Letters Patent is:

1. A process of preparing fruit juice beverages, comprising the steps of adding to the fresh must a sufficient quantity of sulphurous anhydrid to cleanse the must and leave a part of the anhydrid therein in solution, thereby to render the must capable of being stored for an indefinite period without pasteurization or refrigeration; and subsequently transfusing the must with humidified air to desulphurate it.

2. In a process of preparing fruit juice beverages, the steps of heating sulphurated must, and transfusing the heated must with air humidified with steam in a column to desulphurate the must.

3. In a process of preparing fruit juice beverages, the steps of heating sulphurated must to vaporize the same, introducing the vapors into the upper part of a column, humidifying heated air with steam, and introducing the humified air into the lower part of the column to transfuse and desulphurate said vapors.

In testimony whereof I affix my signature.

FRITZ HOSTETTLER.